Patented Mar. 27, 1951

2,546,551

UNITED STATES PATENT OFFICE 2,546,551

METHOD OF MAKING ALKALI METAL CYANATES

Louis L. Lento, Jr., Springdale, and David W. Jayne, Jr., Old Greenwich, Conn., assignors to American Cyanamid Company, New York, N. Y., a corporation of Maine No Drawing. Application January 25, 1950, Serial No. 140,544. In France May 23, 1949

10 Claims. (Cl. 23—75)

1

The present invention relates to the preparation of alkali metal cyanates with a very low content of cyanides and other impurities traceable to the material of the reaction vessel used in said preparation.

It is an object of the invention to prepare alkali metal cyanates containing not more than 0.1% metal cyanide and with no more than traces of silica or similar contaminants due to the character of the reaction vessel. It is a further object of the invention to prepare alkali metal cyanates that may be handled without the formation of dangerous amounts of hydrogen cyanide. A still further object of the invention is to prepare a potassium cyanate in unusually high yield from dicyandiamide and potassium carbonate. Another object is to prepare a low-cyanide potassium cyanate in a semi-permanent reaction vessel. It is a still further object of the invention to react nitrogenous organic compound with an alkali metal carbonate in an aluminum container.

Additional objects will appear from the discussion hereinafter.

The alkali metal cyanates are valuable weed killers, potassium cyanate being particularly effective. However, its use as such in the past has suffered from the disadvantage that the potassium cyanate of commerce contained appreciable quantities of cyanides, which hydrolyzed over a period of time owing to the presence of atmospheric moisture, or hydrolyzed quickly when placed in aqueous solution, in either event evolving dangerous quantities of hydrogen cyanide. In the prior commercial manufacture of potassium cyanate, using dicyandiamide or the like, potassium cyanide in the amount of 1 or 2% was always formed because the reaction was conducted in an iron pot. It is believed that iron catalyzes the reduction of cyanates to cyanides, and thus appreciable contamination with cyanides was always encountered. It is believed that this catalysis works indirectly as follows. Iron, nickel, and all the metals of group 8 of the periodic table catalyzed the decomposition of ammonia to nitrogen and hydrogen. It is believed that the hydrogen so-formed then reacts with the cyanate to form a cyanide and water. An iron pot also has the disadvantage of a high rate of corrosion, resulting not only in low pot life but discoloration of the product.

Consequently, workers in this field attempted to use pots made of metals other than those of group 8 of the periodic table. Since the reaction must be conducted at 340°—550° C. for efficient yields, obviously, metals such as tin, cadmium,

2 zinc, bismuth, etc., are unsuitable on account of their low melting points. Silver was found to be unsuitable because the metal quickly recrystallized and permitted the charge to seep through the pot. Platinum was found to be inadequate because it not only catalyzed the formation of cyanides but also dissolved quickly into the charge. A copper pot was tried but it was found that a film of copper oxide formed and then continuously dissolved into the charge. A graphite pot was found to be unsuitable because the charge leaked through the interstices of the graphite particles, solidified therein, and cracked the container. Gold was ruled out because of its excessive cost for a commercial operation. Various ceramic pots were tried, including such dense ceramics as zirconia, but it was found that these dissolved into the charge with varying degrees of rapidity, necessitating rapid and costly replacement even when the dissolved matter was acceptable from a commercial standpoint.

Magnesium was known to be oxidized in the presence of potassium cyanate with almost explosive violence, and hence could not be used as a container.

The surprising discovery was then made that aluminum, despite its known corrodibility in the presence of fused alkalies, could be used, and was in fact the only pot found that could be used commercially.

The following examples illustrate without limiting the invention.

Example 1

An aluminum pot of 400 lbs. melt capacity with a vertical divider was used so that the reactants could be fed to and the reaction take place substantially in one portion of the pot, and the product could flow into the adjacent portion and from there be drawn off. The pot was heated with external electrical resistance strip heaters, but any other suitable heating means may of course be used. A heel of 200 lbs. of potassium cyanate was fused in the bottom of the pot, and the temperature was brought up to 400°–450° C. A mixture of 3000 lbs. commercial grade potassium carbonate (about 99% pure) and 1300 lbs. of commercial grade dicyandiamide (about 99% pure) was then run into the reaction portion of the pot, and permitted to fuse. The melt formed was sufficient to fill both sides of the pot, and as soon as the melt ceased bubbling, denoting substantial completion of the reaction, additional mix was added to the reaction portion of the pot, thereby forcing out material from the exit side, which was collected as pigs and allowed to cool. Thereafter, additional mix was added at a rate such that the melt being discharged bubbled very little. This was equivalent to adding mix at the rate of about 179 lbs. per hour. The addition is conveniently carried out continuously by means of a hopper feeding a vibrating trough, a number of which mechanisms are standard, and easily adjustable to provide the feed rate desired.

Among the gaseous by-products of the reaction are about 350 lbs. of ammonia and 450 lbs. of carbon dioxide, which may be separated and recovered for use, or the mixture may be dissolved in water for use as a fertilizer.

Example 2

The foregoing example may be compared with a second example in which a smaller pot was used, as follows.

|  | Example 1 | Example 2 |
|---|---|---|
| Pot capacity, lbs. of melt | 400 | 49 |
| Pot temperature, °C | 440–450 | 375 |
| Feed, lbs. $K_2CO_3$/lbs. dicyandiamide | 2.30 | 2.19 |
| Feed rate, lbs./hr | 179 | 20 |
| Product recovery rate, lbs./hr | 146 | 16 |
| Residence time, hrs | 2.74 | 3.06 |
| Lbs. product/lbs. feed | 0.817 | 0.800 |
| Per cent KCNO in product | 94–96 | 97.64 |
| Per cent KCN in product | 0.01–0.05 | <0.003 |

The effect of low reaction temperature on cyanide content is shown clearly in Example 2. Here the feed rate was fast enough to give a reaction temperature of only 375° C., resulting in extremely low cyanide formation. The relatively high residence time was neutralized by the low temperature, so that the overall result was low cyanide formation.

In general, to keep cyanide formation low it is desirable to use as short a residence time and as low a temperature as possible, within known limits. In one experiment on a laboratory scale, a residence time of only 30 minutes was found possible. Ordinarily, it will be considerably longer. The temperature may vary from the fusion point of the charge, about 340° C. up to about 550° C., at which temperature the aluminum pot becomes dangerously weakened.

The efficiency of the process is limited mainly by the difficulty of applying a large amount of heat to the aluminum pot without melting it, and is also limited by the ability of the aluminum pot to transmit the heat it receives to the charge. Under practical conditions, as much heat as possible is supplied to the pot without weakening it, and then the rate of feed is increased until it is sufficient to maintain the pot temperature at a predetermined point. In Example 1 above, this predetermined temperature was 440°–450° C., and the rate of feed necessary to keep the temperature this low was found to be 179 lbs./hr.

It is preferred, therefore, to use a temperature in the lower range of 340°–450° C., and as great a feed rate as possible without causing the temperature to drop below 340° C. (or even more preferably, not below 375° C., in order to provide a margin of safety). However, the feed rate should not be so great that the reaction is incomplete. At least about half an hour's residence time should be allowed for the charge in the pot.

It is also preferred, when using dicyandiamide, to use a feed consisting of 1.3–1.4 mols of potassium carbonate to 1 mol of dicyandiamide for the best yields of cyanate, other factors being equal.

While it is preferred to use dicyandiamide as the source of cyanate nitrogen a wide variety of other organic nitrogen compounds added as such or produced in situ, as from ammonia and carbon dioxide, may be used to make low-cyanide cyanates free from discoloration in an aluminum reactor, and without corroding the reaction vessel. Among such organic nitrogen compounds are urea, biuret, melamine, ammeline, ammelide, melam, melem, melon, guanidine carbonate, biguanide, and the like.

Example 3

Using apparatus and procedure analogous to that of the preceding examples, 394 lb. of urea and 362 lb. of potassium carbonate were reacted at 450° C. for 1 hr., to give 422 lb. of 92% pure potassium cyanate of low cyanide content, comparable to that of the preceding examples. Nitrogen recovery based on urea was 36.5%, about half that obtainable from dicyandiamide.

If desired, sodium carbonate may be substituted for some of the potassium carbonate in the charge. It is preferred, however, when using sodium carbonate in the charge, to keep the potassium carbonate to sodium carbonate mol ratio at about 1/3 or higher, as a lower ratio requires dangerously high pot temperatures. The thus-prepared mixed potassium-sodium cyanates are very low in cyanide content and are valuable weed killers.

While the examples herein have been described on a continuous basis, they may obviously be conducted on a batch basis by simply emptying the pots completely after the evolution of the reaction gases ceases, and starting anew. The continuous embodiment of the process is obviously the preferred one.

This invention is a continuation-in-part of our application, Serial No. 90,044, filed April 27, 1949, now abandoned.

While the invention has been described with particular reference to specific embodiments, it is to be understood that it is not to be limited thereto but is to be construed broadly and restricted solely by the scope of the appended claims.

We claim:

1. The method of preparing a cyanate comprising fusing an organic nitrogen compound and a member of the group consisting of potassium carbonate and potassium carbonate-sodium carbonate mixtures in an aluminum container and recovering the said cyanate.

2. The method according to claim 1 in which the organic compound is ammelide.

3. The method of claim 2 in which the mole ratio of dicyandiamide to potassium carbonate is 1:1.3–1.4, and the temperature is 375°–450° C.

4. The method according to claim 1 in which the organic compound is urea.

5. The method according to claim 1 in which the organic compound is melamine.

6. The method according to claim 1 in which the organic compound is ammeline.

7. The method according to claim 1 in which the organic compound is ammelide.

8. The method of preparing a cyanate comprising fusing dicyandiamide and a member of the group consisting of potassium carbonate and potassium carbonate-sodium carbonate mixtures, said mixtures being in the respective mol ratio of at least 1:3, in an aluminum container, and recovering said cyanate.

9. The method of preparing potassium cyanate comprising heating dicyandiamide and potassium carbonate in an aluminum container at a temperature of 340°–550° C., and recovering the thus-formed cyanate.

10. The method comprising continuously adding mixture consisting of dicyandiamide and potassium carbonate in the mole ratio of about 1:1.35 into an aluminum reaction vessel maintained at a temperature of 375°–450° C., whereby potassium cyanate is formed, and continuously withdrawing said potassium cyanate from the reaction vessel.

LOUIS L. LENTO, Jr.
DAVID W. JAYNE, Jr.

REFERENCES CITED

The following references are of record in the file of this patent:

UNITED STATES PATENTS

| Number | Name | Date |
| --- | --- | --- |
| 999,003 | Acker | July 25, 1911 |